United States Patent [19]

Tsuji et al.

[11] Patent Number: 4,502,768
[45] Date of Patent: Mar. 5, 1985

[54] CAMERA WITH A BUILT-IN STROBO

[75] Inventors: Kunio Tsuji, Nagaokakyo; Naofumi Aoki, Takatsuki, both of Japan

[73] Assignee: West Electric Company, Ltd., Osaka, Japan

[21] Appl. No.: 488,709

[22] Filed: Apr. 26, 1983

[30] Foreign Application Priority Data

Apr. 28, 1982 [JP] Japan .............................. 57-62971[U]

[51] Int. Cl.³ .............................................. G03B 15/05
[52] U.S. Cl. .............................. 354/145.1; 354/149.11; 354/288
[58] Field of Search ................ 354/126, 145.1, 149.11, 354/187, 288

[56] References Cited

U.S. PATENT DOCUMENTS

| | | | |
|---|---|---|---|
| 3,906,526 | 9/1975 | Toyoshima et al. | 354/149.11 |
| 4,106,037 | 8/1978 | Nakamura et al. | 354/288 |
| 4,189,222 | 2/1980 | Maitani | 354/126 |
| 4,299,465 | 11/1981 | Chan | 354/187 |

Primary Examiner—A. A. Mathews
Attorney, Agent, or Firm—Cushman, Darby & Cushman

[57] ABSTRACT

The present invention relates to a camera with a built-in strobo which comprises a small strobo and a lens cover for protecting a photographing lens, the strobo operating when a flashing part is shifted to a predetermined position, and further comprises a member being in association with the lens cover and an operation knob for controlling a movement of the flashing part; and when the lens cover is disposed in front of the photographing lens, pop-out or stowing of the strobo can not be executed by controlling the member through manipulation of the operation knob.

2 Claims, 3 Drawing Figures

CAMERA WITH A BUILT-IN STROBO

BACKGROUND OF THE INVENTION

1. Field of the Invention

The present invention relates to a camera with a built-in strobo.

More particularly, the present invention concerns a camera which has a slidable lens cover, and a strobo which can flash only when its flashing part is shifted to a predetermined position.

2. Description of the Prior Art

Hitherto, a camera with a built-in strobo is well-known, wherein its strobo can operate only when a flashing part of it is shifted to a predetermined position. Various types of such cameras have been proposed or put into practical use.

In most of these cameras, the shifting of the flashing part of the strobo is executed by resiliency of a spring and a strobo operation knob which is associated with a controlling members for controlling the spring. That is, the shifting of the flashing part of the strobo is executed by handling a strobo operation knob and an electric circuit of the strobo is driven, for example, when the flashing part comes to a predetermined position.

And as to the camera itself, a camera which has a lens cover for protecting a photographing lens are becoming popular in recent years. Such lens cover can protect the lens, but on the other hand, problems occur if shutter is released condition where the lens cover is covering the lens. Accordingly, most of these cameras have such shutter release mechanism that the lens cover is linked with some connection with the shutter release operation, for example, in a manner that the shutter release cannot be operated when the lens cover is covering the lens.

On the other hand, when a camera with a built-in strobo has a flashing part which shifts to a predetermined position, namely the flashing operating position, when the camera has a lens cover, it is of course unnecessary that the flashing part of the strobo should shift to the predetermined flashing operation position when the lens cover is covering the lens, since the photographing cannot be executed in such state. Rather, if the configuration is such that the flashing part can shift to the position in the above-mentioned condition of the lens being covered by the cover, a trouble of wasteful flashing hence waste of energy occurs, since the electric circuit operation is energized by shifting of the flashing part as above-mentioned. Accordingly, it is preferable that the shifting of the flashing part of the strobo is linked not only with the strobo operation knob but also with the state of the lens cover.

However, concerning the conventional practical camera with a built-in strobo and the lens cover, wherein the flashing part is able to shift to the flashing operation position, the flashing part of the strobo has not generally been linked to be controlled responding to a state of the lens cover as above-mentioned. The flashing part of the strobo in the conventional camera has been shifted to the predetermined flashing position only by manual operation of the strobo operation knob.

SUMMARY OF THE INVENTION

The present invention intends to provide a camera with built-in strobo, wherein a flashing part of this built-in strobo cannot shift when the lens cover overlays the photographing lens.

DESCRIPTION OF THE PREFERRED EMBODIMENTS

A camera with a built-in strobo of the present invention comprises:

a strobo which can operate when a flashing part is shifted to a predetermined position, and a lens cover which can be shifted, for example slidingly, to a position in front of a photographing lens to protect it, and characterized by further comprising:

shifting means for making the flashing part shift to the predetermined position, operation means for controlling an operation of the shifting means based on a manipulation, and control means for controlling the operation means in association with the movement of the lens cover, the movement of the flashing part being controlled by a position of the lens cover.

Figure 1:
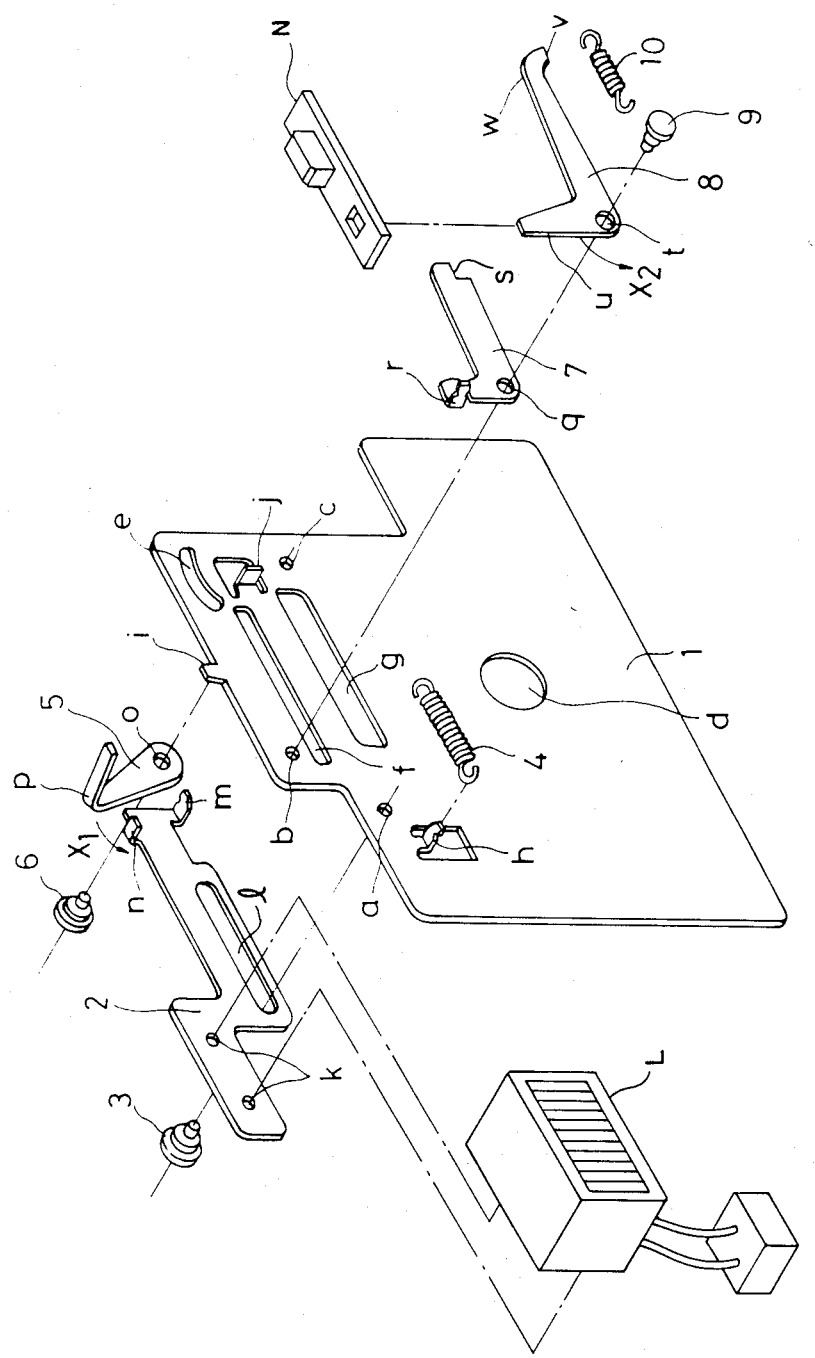
FIG. 1 is an exploded perspective view showing main parts of an embodiment of the present invention.

FIG. 1 shows an exploded perspective view of main parts of an embodiment of the present invention. A base plate 1 is a member to which various structural parts are mounted. The base plate 1 has calking holes "a", "b" and "c", a hole "d" which passes a light from an object through slots "e", "f" and "g", a projecting hook "i", a bent hook "h" and a bent pawl "j". A bearing lever 2 supports a known strobo flashing part, which is illustrated in FIG. 1. The bearing lever 2 has screw holes "k", a slot "l" and a bent hook "m" and a bent pawl "n". A pivot 3 is used for the bearing lever 2 which is slidably mounted to the base plate 1. The pivot 3 passes through the long slit "l" of the bearing lever 2, and an edge of the pivot 3 is calked at the calking hole "a". A spring 4 forces bearing lever 2 to move to a predetermined direction since one end of the spring 4 is hooked on a bent hook "h" and the other end of the spring 4 is hooked on a bent hook "m" of the bearing lever 2. The bent hook "m" projects through the long slit "g" on a side of the base plate 1, in which side the bent hook "h" projects. A hook lever 5 is in association with a known lens cover which is not illustrated in FIG. 1. The hook lever 5 has a round hole "o" and a bent arm "p" and is moved by a known spring not illustrated in FIG. 1 at all times in a direction indicated with an arrow $X_1$. A further pivot 6 is used for rotatably fitting the hook lever 5 to the base plate 1. The pivot 6 passes through the round hole "o" of the hook lever 5, and an edge of the pivot 6 is calked at the calking hole "c" of the base plate 1. A further hook lever 7 hooks the bearing lever 2 which is shifted by the spring 4 in a direction. The hook lever 7 has a round hole "q" and a bent hook "r". An operation lever 8 links up with an operation knob N of a strobo shown in FIG. 1 and the operation lever 8 rotates in a direction indicated by an arrow $X_2$ when the knob N is operated. The operation lever 8 has a round hole "t". A further pivot 9 is used for rotatably fitting the hook lever 7 and the operation lever 8 to the base plate 1. The pivot 9 passes through both the round hole "q" of the hook lever 7 and the round hole "t" of the operation lever 8, and an edge of the pivot 9 is calked at the calking hole "b" of the base plate 1. A spring 10 forces hook lever 7 and operation lever 8 to move in a predetermined direction. One end of the spring 10 is hooked on the bent hook "r" of the hook lever 7, and the other end of the spring 10 is hooked on the projecting hook "i" of the base plate 1.

Furthermore, since the hook lever 7 and the operation lever 8 are mounted to the base plate 1 by using the pivot 9, both levers 7 and 8 being overlapping with each other, an edge surface "u" of the operation lever 8 abuts on the bent hook "r" of the hook lever 7. An edge surface "s" of the hook lever 7 can abut on the bent pawl "n", and an edge surface "w" of the operation lever 8 can abut on the arm "p" of the hook lever 5, and an edge surface "v" of the operation lever 8 can abut on the bent pawl "j" of the base plate 1.

Figure 2:
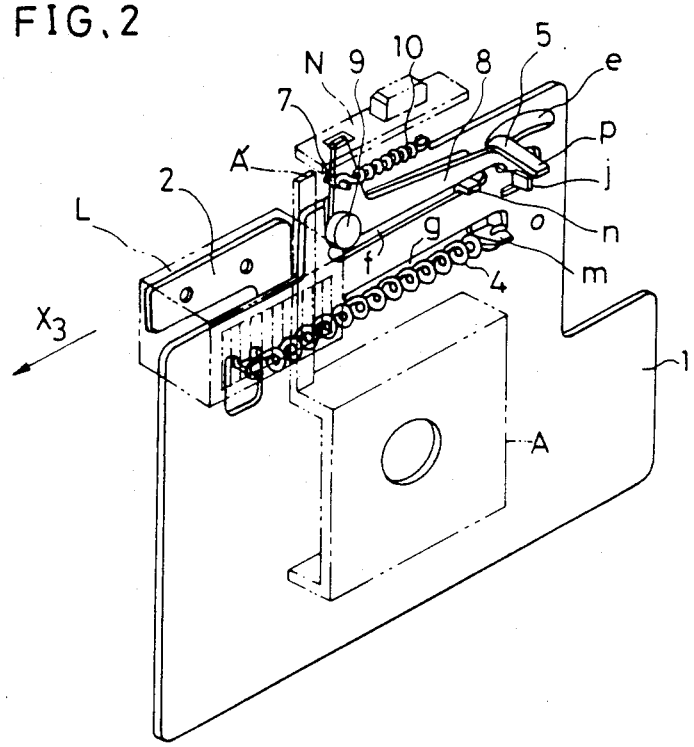
FIG. 2 is a perspective view of the embodiment of the present invention, which is constructed by assembling members shown in FIG. 1.

FIG. 2 is a perspective view showing a state of constructed main part of the present invention. An example of a lens cover A is indicated by two-dot chain line in FIG. 2. The lens cover A has, for example, a stick-like part A'.

As apparent in FIG. 2, when the lens cover A is situated at such position that can cover a ray transmitting hole "d" which is arranged at a photographing lens, the stick-like part A' is disposed far from the position of the hook lever 5. Therefore, the stick-like part A' does not abut on the bent arm p of the hook lever 5 and the hook lever 5 is shifted to the left edge of the long slit "e" as shown in FIG. 2 by a spring, which is not shown in FIG. 2.

Accordingly, the bent arm "p" of the hook lever 5 abuts on the edge surface "w" of the operation lever 8 and prevents the rotative movement of the operation lever 8 to the direction as indicated by an arrow $X_2$ in FIG. 1.

Accordingly in FIG. 2, since the bearing lever 2 which supports the flashing part L of the strobo can not shift to the direction which is determined by the resiliency of the spring 4, since the bent pawl "n" abuts on the edge surface "s" of the hook lever 7. That is, the hook lever 2 is hooked in a condition that the spring 4 is stretched.

If the bent pawl "n" of the bearing lever 2 separates from the edge surface "s" of the hook lever 7, as can be easily understood, the hook lever 2 can shift to the arrow direction $X_3$, shown in FIG. 2, by the resiliency of the spring 4. However, as above-mentioned, when the bent arm "p" of the hook lever 5 abuts on the edge surface "w" of the operation lever 8, the operation lever 8 can not rotate to the left direction. Therefore, the hook lever 7 does not rotate of course, since the hook lever 7 is overlapping with the operation lever 8 and is forced to abut on the operation lever 8 by the spring 10. Therefore, in the state in FIG. 2, the edge surface "s" of the hook lever 7 cannot separate from the bent pawl "n" of the bearing lever 2 and as the result the bearing lever 2 does not shift. Incidentally, such state that the operation lever 8 cannot rotate means that a strobo operation knob N of the strobo, which is illustrated in FIG. 2, cannot be operated.

Figure 3:
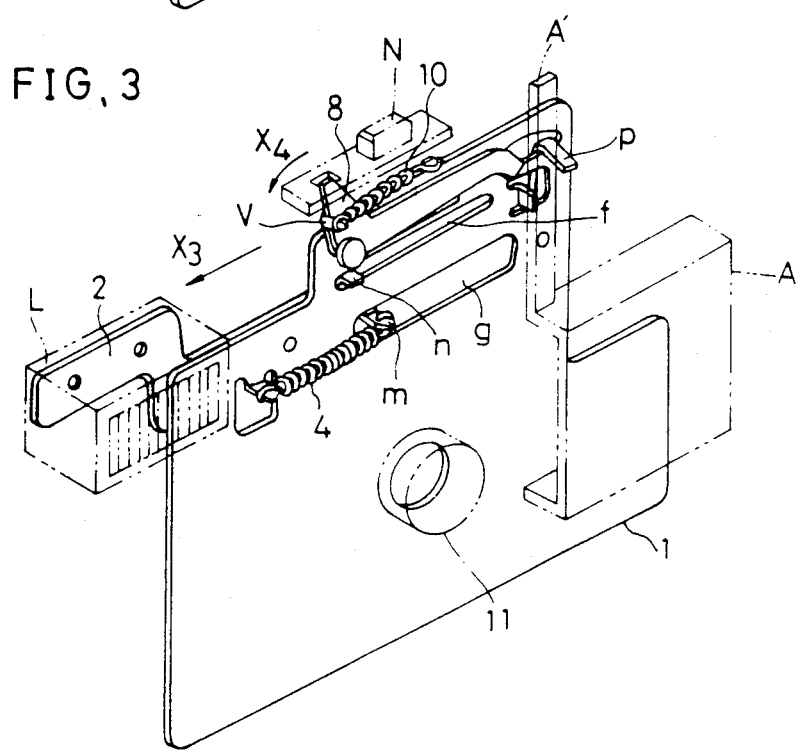
FIG. 3 is a perspective view of the embodiment of FIG. 2 but in another operating state.

When the lens cover A is shifted out from the position in front of the lens, the stick-like part A' abuts on the bent arm "p" of the hook lever 5 as shown in FIG. 3. Therefore, the hook lever 5 is shifted from the left edge of the long slit "e" to the right edge of it against the resiliency of the spring which is not illustrated in FIG. 3. That is, the stick-like part A' operates as a member for releasing the hooking of the hook lever 5.

Therefore, the abutting state of the bent arm "p" on the hook lever 5 and the edge surface "w" of the operation lever 8 is released. And the operation lever 8 is allowed to be rotated to the direction indicated by an arrow $X_2$ round the pivot 9 by the operation of the strobo operation knob, N as illustrated in FIG. 3, against the resiliency of the spring 10.

Now, when the operation lever 8 is rotated to the direction indicated by an arrow $X_4$, around the pivot 9 by the strobo operation knob, N as illustrated in FIG. 3, the hook lever 7 rotates naturally to the same direction, since the lever 7 has the bent hook "r" which is enforced to abut on the edge surface "u" of the operation lever 8 by the resiliency of the spring 10.

When the hook lever 7 rotates to the direction indicated by arrow $X_4$, the edge surface "s" of the hook lever 7 separates from the bent pawl "n" of the bearing lever 2. Therefore, the bearing lever 2 is shifted forcibly to the direction indicated by an arrow $X_3$ by the resiliency of the spring 4 and reaches at the position as illustrated in FIG. 3 and causes the flashing part L, illustrated in FIG. 3, to be shifted to the flashing operation position.

As above-mentioned, the relationship of the state of the lens cover A and the state of the bearing lever 2 bearing the flashing part L of the strobo is explained referring to FIGS. 2 and 3. That is, when the lens cover A is disposed in front of the photographing lens, the strobo operation knob N can not be operated, and the bearing lever 2 is left to be hooked by the hook lever 7. And when the lens cover A is shifted from the front position of the photographing lens, the strobo operation knob N can be operated. And by the operation of the strobo operation knob N, the hooking state of the bearing lever 2 is released, and the flashing part L is shifted to the operation position.

When the the camera with a built-in strobo of the present invention is to be closed, members which should be shifted are the bearing lever 2 and the lens cover A. Each member should be lifted from the state shown in FIG. 3 to a state shown in FIG. 2.

Then, when the above-mentioned two members are brought to that closed state, two kinds of closing process can be taken. That is, the bearing lever 2 is brought to its closed state before closing the lens cover A, or alternatively the lens cover A is closed before bearing lever 2 is moved to its closed position together with the flash unit L.

First, the process to close bearing lever 2 prior to that of the lens cover A, is explained as follows.

When the bearing lever 2 is shifted to the operating position by the resiliency of the spring 4 as shown in FIG. 3, the operation of the strobo operation knob N is stopped of course. Therefore, the operation lever 8 has been shifted to the position in FIG. 2 by the resiliency of the spring 10 from the position in FIG. 3.

Then, when the bearing lever 2 is forced by any method to reverse the direction against the arrow $X_3$ direction, namely, right direction in FIG. 3, the bearing lever 2 is shifted to the right direction only against the resiliency of the spring 4 in the beginning.

The bent pawl "n" of the bearing lever 2 is shifted along the slot "g" in keeping the shifting of the bearing lever 2, and in course of time the bent pawl "n" abuts on an under-face of the hook lever 7.

The hook lever 7 is entirely prevented from rotation to the right direction around the pivot 9 since the bent hook "r" abuts on the edge surface "u" of the operation lever 8 and at the same time, the edge surface "v" of this operation lever 8 abuts on the bent pawl "j" of the base plate 1. However, the hook lever 7 can rotate to the left direction around the pivot 9 when a force is impressed on the hook lever 7 against the resiliency of the spring 10. Therefore, the hook lever 7 is forced to rotate gradually to the left direction against the resiliency of the spring 10 by being impressed with a force of the bent pawl "n" of the bearing lever 2. Accordingly, in above-mentioned state, a force which forces the bearing lever 2 to shift is impressed against the resiliency of the spring 4 and the spring 10.

As above-mentioned, the bearing lever 2 is forced to shift to the right direction.

When the bent pawl "n" reaches the position at which the edge surface "s" of the hook lever 7 is formed, the abutting of the bent pawl "n" to the underface of the hook lever 7, the abutting having inhibited the hook lever 7 from rotation to the left direction, is dissociated each other. Therefore, the hook lever 7 rotates to the right direction.

As can be easily seen, when the bearing lever 2 is shifted to the right direction and the hook lever 7 rotate to the right direction as above-mentioned, the bent pawl "n" becomes to be able to abut the edge surface "s" of the hook lever 7. By the abutting of the bent pawl "n" and the edge surface "s", the camera with a built-in strobo is brought to a close state in such state that the bearing lever 2 is hooked as shown in FIG. 2. After that, when the lens cover A is shifted to the left direction from the state of FIG. 3, the abuttings of the hook lever 5 and the stick-like part A' are dissociated each other. Therefore, the hook lever 5 rotates to the left direction and the bent arm "p" abuts on the edge surface "w" and prevents a rotation of the operation lever 8 entirely. That is, the two members of the lens cover A and the bearing lever 2 are brought to a close state wholly as shown in FIG. 2.

Second, a process to bring the lens cover A to a close state shown in FIG. 2 prior to that of the bearing lever 2, is explained as follows. As apparent from the above-mentioned description, only the hook lever 5 is controlled by the lens cover movement when the lens cover A is shifted to the position to be closed. And the operation lever 8 rotates to the right direction by the spring 10. Therefore, even if the bearing lever 2 is shifted to the right direction, after the lens cover A is shifted to the left direction, the closing operation is the same as the operation which is explained above.

That is, concerning the camera with a built-in strobo of the present invention, only the hook lever 7 is controlled by the bearing lever movement when the bearing lever 2 is shifted to a position to be closed from an operation position. And the hook lever 7 does not have direct association with the movement of the lens cover A. Therefore, it is unnecessary to close the bearing lever 2 or the lens cover A in a specified order. In other words either of the bearing lever 2 or the lens cover A can be brought to the close state.

The reason is that, when the lens cover A is at the position as shown in FIG. 2, the operation lever 8 can not be operated. And accordingly, when the bearing lever 2 is at the position shown in FIG. 2, it is caught being hooked. Incidentally, when the bearing 2 is at the position shown in FIG. 3, it can freely return to the position as shown in FIG. 2.

As above-mentioned, movement of the flashing part of the built-in strobo of the present invention is restricted by making the strobo operation knob N which is controlled in association with the lens cover movement. Therefore, the camera with built-in strobo does not have such disadvantage that during the while the lens cover is at the position in front of the photographing lens and the flashing part L is shifted to flash wastefully.

The flashing part L of the built-in strobo can be closed regardless with the state of the lens cover, and can not be shifted to the operation position again unless the lens cover is shifted from the position in front of the photographing lens and the strobo operation knob N is operated, if the flashing part L is stowed once. Therefore, the camera is superior in operation, and furthermore the superior operation is achieved by using simple constitution. Accordingly, the camera with a built-in strobo of the present invention has a very high practical utility.

What is claimed is:

1. A camera with a built-in strobo comprising:
   strobo means for flashing, said strobo means including a flashing portion mounted so as to be movable relative to said camera between operating and closed positions and which can operate when shifted to the operating position,
   a lens cover mounted so as to be movable relative to a photographing lens between open and closed positions,
   shifting means for shifting said flashing portion to said operating position,
   operation means for controlling the operation of said shifting means, and
   control means for controlling the operation of said operation means, said control means being operatively connected to said lens cover so that said flashing portion cannot be moved from its closed position until said lens cover is moved from its closed to its open position whereby movement of said flashing portion is controlled by the position of said lens cover.

2. A camera with a built-in strobo in accordance with claim 1, wherein
   said camera includes a base plate fixed therein, wherein
   said shifting means comprises:
   a bearing lever which bears said flashing portion and is movably mounted on said base plate,
   a first resilient member which forces said bearing lever to shift at all times toward a direction to which said flashing portion is shifted for operating,
   said operation means comprises:
   a first hook lever which is mounted movably on said base plate and has a hooking part which stops the movement of said bearing lever,
   a second resilient member which forces at all times said first hook lever to shift toward a predetermined direction for abutting said bearing lever, and
   an operation lever mounted movably on said base plate,
   a strobo operation knob disposed on an outer surface of said camera for operating said operation lever,
   said first hook lever including means for abutting said operation lever, said abutment being maintained by the resiliency of said second resilient member, said operation lever being able to release said hooking of said bearing lever by making said first hook lever shift against the resiliency of said second resilient member by using said abutment means of said first hook lever, and wherein said control means comprises:

a second hook lever mounted movable on said base plate and including abutment means for abutting said operation lever, said second hook lever forced at all times to shift toward a direction for abutting said operation lever, said second hook lever preventing the movement of said operation lever, said lens cover including a releasing member for abutting said second hook lever and to move said second hook lever when said lens cover is shifted away from said closed position thereby releasing said operation lever.

* * * * *